(12) United States Patent
Boncimino

(10) Patent No.: US 9,830,606 B2
(45) Date of Patent: Nov. 28, 2017

(54) SYSTEMS AND METHODS FOR ENROLLING A USER IN A MEMBERSHIP ACCOUNT

(71) Applicant: VISA INTERNATIONAL SERVICE ASSOCIATION, San Francisco, CA (US)

(72) Inventor: Christopher Boncimino, Orinda, CA (US)

(73) Assignee: VISA INTERNATIONAL SERVICES ASSOCIATION, San Francisco, CA (US)

( * ) Notice: Subject to any disclaimer, the term of this patent is extended or adjusted under 35 U.S.C. 154(b) by 420 days.

(21) Appl. No.: 14/530,048

(22) Filed: Oct. 31, 2014

(65) Prior Publication Data

US 2016/0125377 A1 May 5, 2016

(51) Int. Cl.
  *G06Q 30/02* (2012.01)
  *G06Q 20/20* (2012.01)
  *G06Q 20/22* (2012.01)

(52) U.S. Cl.
  CPC .......... *G06Q 30/02* (2013.01); *G06Q 20/202* (2013.01); *G06Q 20/22* (2013.01)

(58) Field of Classification Search
  CPC ....... G06Q 30/02; G06Q 20/202; G06Q 20/22
  See application file for complete search history.

(56) References Cited

U.S. PATENT DOCUMENTS

| 7,578,430 | B2* | 8/2009 | Michelsen | G06Q 20/387 235/375 |
|---|---|---|---|---|
| 8,484,078 | B1* | 7/2013 | Mankoff | G06Q 30/0226 705/14.17 |
| 2002/0062249 | A1* | 5/2002 | Iannacci | G06Q 20/10 705/14.1 |
| 2006/0031120 | A1* | 2/2006 | Roehr | G06Q 30/02 705/14.13 |
| 2006/0253321 | A1* | 11/2006 | Heywood | G06Q 30/02 705/14.18 |
| 2008/0097783 | A1* | 4/2008 | Iannacci | G06Q 30/0281 705/346 |
| 2010/0106570 | A1* | 4/2010 | Radu | G06Q 20/20 705/14.3 |

(Continued)

*Primary Examiner* — Asfand Sheikh
(74) *Attorney, Agent, or Firm* — Loeb & Loeb, LLP

(57) ABSTRACT

Systems and methods are provided for enrolling a user in a membership account. A payment processing request is received from a point of sale device associated with a merchant. The payment processing request includes an account number associated with a user. Based on the account number, a user account associated with the user is retrieved, where the user account includes address information for communicating with a computing device that is associated with the user. Computer-readable instructions are transmitted to the computing device based on the address information, the computer-readable instructions causing the computing device to prompt the user to enroll in a membership account associated with the merchant. A response is received from the computing device indicating consent from the user to enroll in the membership account. Based on the response, an enrollment request is transmitted to the merchant, where the enrollment request includes user information from the user account.

17 Claims, 7 Drawing Sheets

(56) References Cited

U.S. PATENT DOCUMENTS

2013/0080236 A1\* 3/2013 Royyuru ............... G06Q 40/02
                                                    705/14.27
2016/0232513 A1\* 8/2016 Purves ............. G06F 17/30525

\* cited by examiner

SYSTEMS AND METHODS FOR ENROLLING A USER IN A MEMBERSHIP ACCOUNT

FIELD

The technology described in this patent document relates generally to account creation and more particularly to systems and methods for enrolling a user in a membership account without a need for the user to manually input his or her personal information.

BACKGROUND

In order to gain access to a service provided by a service provider, a user may first be required to create an account with the service provider. For example, in order to purchase an item from a website operated by a merchant or receive special offers from the merchant, the user may first be required to create an account with the merchant. Typically, creating an account with a service provider requires the user to provide detailed personal information. Such detailed personal information may include the user's name, home address, telephone number, email address, and payment information (e.g., credit card number), among other information. In providing this information, a user may be required to manually enter data via an input device (e.g., a keyboard of a laptop or desktop computer or a touchscreen of a mobile phone or tablet, etc.). The manual entry of this information may be time-consuming, and the user may make mistakes in entering the data. Accounts may be created using alternative methods (e.g., signing up for an account over the phone by speaking to a representative of the service provider, etc.), but these alternative methods may be time-consuming and may lead to erroneous data being recorded by the service provider.

SUMMARY

The present disclosure is directed to a computer-implemented method, system, and non-transitory computer-readable storage medium for enrolling a user in a membership account. In an example computer-implemented method for enrolling a user in a membership account, a payment processing request is received from a point of sale device associated with a merchant. The payment processing request includes an account number associated with a user. Based on the account number, a user account associated with the user is retrieved, where the user account includes address information for communicating with a computing device that is associated with the user. Computer-readable instructions are transmitted to the computing device based on the address information, where the computer-readable instructions cause the computing device to prompt the user to enroll in a membership account associated with the merchant. A response is received from the computing device indicating consent from the user to enroll in the membership account. Based on the response, an enrollment request is transmitted to a computer system associated with the merchant, where the enrollment request includes user information from the user account.

An example system for enrolling a user in a membership account includes a processing system and a memory in communication with the processing system. The processing system is configured to execute steps. In executing the steps, a payment processing request is received from a point of sale device associated with a merchant. The payment processing request includes an account number associated with a user. Based on the account number, a user account associated with the user is retrieved, where the user account includes address information for communicating with a computing device that is associated with the user. Computer-readable instructions are transmitted to the computing device based on the address information, where the computer-readable instructions cause the computing device to prompt the user to enroll in a membership account associated with the merchant. A response is received from the computing device indicating consent from the user to enroll in the membership account. Based on the response, an enrollment request is transmitted to a computer system associated with the merchant, where the enrollment request includes user information from the user account.

In an example non-transitory computer-readable storage medium for enrolling a user in a membership account, the computer-readable storage medium includes computer-executable instructions which, when executed, cause a processing system to execute steps. In executing the steps, a payment processing request is received from a point of sale device associated with a merchant. The payment processing request includes an account number associated with a user. Based on the account number, a user account associated with the user is retrieved, where the user account includes address information for communicating with a computing device that is associated with the user. Computer-readable instructions are transmitted to the computing device based on the address information, where the computer-readable instructions cause the computing device to prompt the user to enroll in a membership account associated with the merchant. A response is received from the computing device indicating consent from the user to enroll in the membership account. Based on the response, an enrollment request is transmitted to a computer system associated with the merchant, where the enrollment request includes user information from the user account.

DETAILED DESCRIPTION

Figure 1:
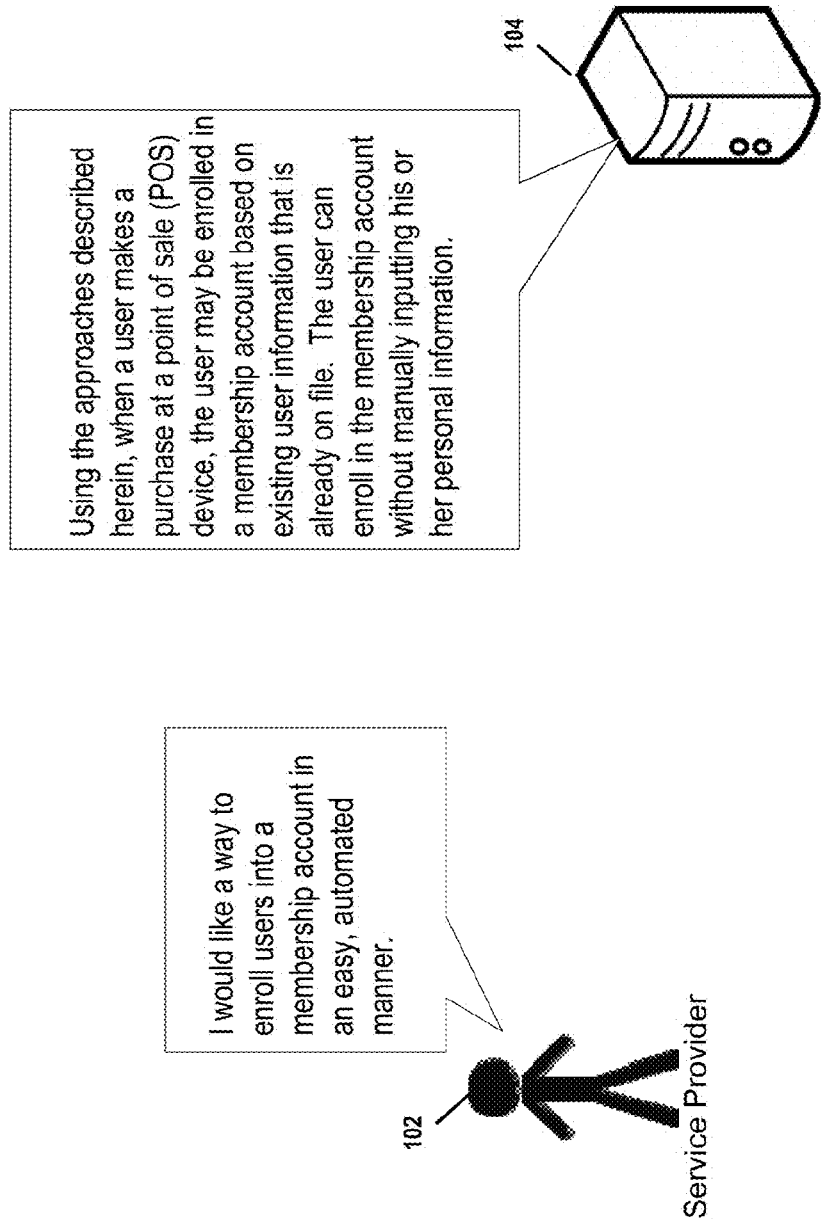
FIG. 1 shows a block diagram illustrating example features of the account creation processes described herein.

FIG. 1 shows a block diagram illustrating example features of the account creation processes described herein. As illustrated in FIG. 1, a service provider 102 may wish to enroll users into a membership account in an easy, automated manner. In an example, the service provider 102 is a merchant that operates both a physical store (i.e., a "brick and mortar" store) and an online store. The merchant may wish, specifically, to enroll in-store shoppers in membership accounts with its online store in a convenient, automated manner that does not require the shopper to manually enter his or her personal information (e.g., the shopper's name, home address, telephone number, email address, and payment information, etc.).

Conventionally, the merchant's physical store may have little or no connection to its online store, such that in-store shoppers do not necessarily become online shoppers. The account creation approach 104 described herein helps to remedy this issue for merchants by converting transactions at the merchant's physical store (e.g., transactions at a physical Point of Sale (POS) device) into pre-registered accounts at the merchant's online store. Creation of a pre-registered account is based on existing information that is already on file for the customer, such that the customer is enrolled in the account without manually inputting his or her information. In another example, the service provider 102 is any entity that provides a service for which consumers must register. Thus, it should be understood that the systems and methods described herein are not limited to the examples involving merchants described below.

Figure 2:
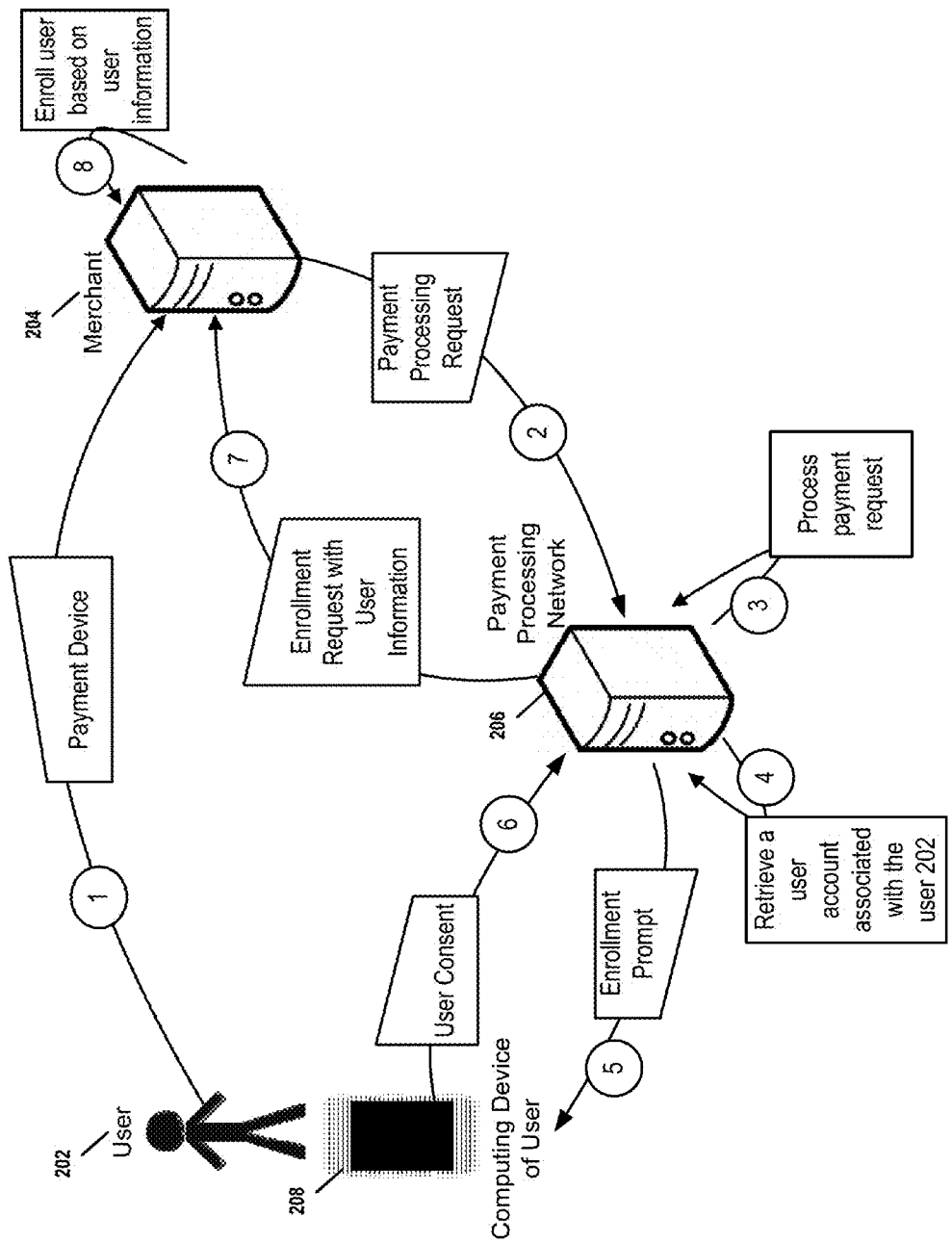
FIG. 2 is a block diagram illustrating example interactions between a user, merchant, and payment processing network for enrolling the user into a membership account with the merchant.

FIG. 2 is a block diagram illustrating example interactions between a user 202, merchant 204, and payment processing network 206 for enrolling the user 202 into a membership account with the merchant 204. As described above, a physical store operated by the merchant 204 may have little or no connection to an online store operated by the merchant 204, such that in-store shoppers do not necessarily become online shoppers. As described below with reference to FIG. 2, the account creation processes described herein may help the merchant 204 increase the user-base of its online store by converting transactions at a POS device of the physical store into pre-registered accounts at the online store. Specifically, when the user 202 makes a payment at the physical store of the merchant 204 using a payment device, the user 202 may be prompted via his or her computing device 208 to enroll in a membership account with the merchant 204. The membership account may be, for example, a membership account in the online store of the merchant 204. If the user 202 consents, the payment processing network 206 transmits personal information for the user 202 to the merchant 204, and the merchant 204 can then proceed to enroll the user 202 without requiring additional input from the user 202. These features are described in greater detail below.

As illustrated in FIG. 2, initially, the user 202 provides his or her payment device to the merchant 204 in order to make a payment to the merchant 204. The providing of the payment device to the merchant 204 occurs at a physical POS device associated with the merchant 204 and may occur in the physical store of the merchant 204, for example. In providing the payment device to the merchant 204, the user 202 provides at least an account number and any other information necessary to complete the payment transaction with the merchant 204. To complete this transaction, a payment processing request is transmitted from the merchant 204 to a payment processing network 206. The payment processing network 206 is operated, for example, by Visa, MasterCard, or another company that offers similar payment processing services. In an example, the payment processing network 206 is the VisaNet payment processing network operated by Visa. The payment processing request is transmitted from the POS device associated with the merchant 204, and the payment processing request may include the account number or a representation thereof (e.g., a token, cryptogram, or another representation of the account number) and a merchant identifier (i.e., a "merchant ID") associated with the merchant 204. The account number may be, for example, a credit card number, a debit card number, a bank account number, a number associated with a digital payment service, a pre-paid card number, or another such account number. The merchant ID is any data (e.g., a number, sequence of characters, combination of numbers and letters, etc.) that uniquely identifies the merchant 204.

After receiving the payment processing request including the account number (or representation thereof, as described above) and the merchant ID, the payment processing network 206 processes the payment processing request. This processing includes conventional processing required to complete the payment transaction. Such conventional processing is known to those of ordinary skill in the art and may involve additional entities not depicted in FIG. 2 (e.g., an acquirer, an issuer, etc.). The payment processing network 206 also performs additional actions as part of the exemplary account creation process described herein. Specifically, the payment processing network 206 may determine if the merchant 204 is enrolled in a service for automatically enrolling in-store customers into membership accounts. This determination may include querying a database based on the merchant ID included in the payment processing request, where the results of the query indicate if the merchant 204 is enrolled in the service. If the merchant 204 is not enrolled in the service, the payment processing network 206 performs only the conventional payment processing steps for completing the payment transaction and does not perform the steps described below for creating an account.

If it is determined that the merchant 204 is enrolled in the service, the payment processing network 206 retrieves a user account associated with the user 202. The retrieval of the user account may include querying a database based on the account number or representation thereof included in the payment processing request. In an example, the user account associated with the user 202 is a user account for a digital payment service offered by the payment processing network 206. For instance, in an example where the payment processing network 206 is the VisaNet payment processing network, the payment processing network 206 determines if the user 202 has a user account with the Visa Checkout digital payment service. If the user 202 is enrolled in the digital payment service, the payment processing network 206 then retrieves the user account for the user 202, where the user account comprises personal information for the user 202.

Such personal information may include the user's name, home address, email address, telephone number, and payment information, among other information. It should be understood that the description herein regarding the digital payment service is exemplary only and that the user account retrieved by the payment processing network 206 need not be associated with a digital payment service. Specifically, the payment processing network 206 may retrieve any type of user account including user information that is adequate for carrying out the account creation steps described below. In an example, the user information of the user account is stored in a data structure that is included on one or more non-transitory, computer-readable storage mediums.

Along with the above-described personal information, the retrieved user account also includes address information for communicating with a computing device 208 that is associated with the user 202. Specifically, in an example, the computing device 208 is a mobile phone associated with the user 202, and the address information is information that allows for communication with the mobile phone. The address information may comprise, for example, an email address associated with the user 202, a phone number associated with the computing device 208 (e.g., a mobile phone number to which a Short Message Service (SMS) message may be sent, etc.), or another type of address information for communicating with the computing device 208 (e.g., an IP address, MAC address, etc.). As described above, the computing device 208 may be a mobile phone, and in other examples, the computing device 208 is a a tablet computer, a laptop computer, a desktop computer, or another device.

Using the address information included in the retrieved user account, the payment processing network 206 transmits computer-readable instructions to the computing device 208 of the user 202, where the computer-readable instructions cause the computing device 208 to prompt the user 202 to enroll in a membership account with the merchant 204. For example, the payment processing network 206 may transmit a command to the mobile phone 208 of the user 202, where the command is capable of causing the mobile phone 208 to prompt the user 202 to enroll in the membership account with the merchant 204.

The user 202 may be prompted to enroll in the membership account with the merchant 204 while the user 202 is still completing the in-store purchase transaction with the merchant 204. In another example, the user 202 is prompted to enroll in the membership account shortly after the completion of the in-store purchase transaction with the merchant 204. Thus, in both examples, the user 202 is prompted to enroll in a membership account with a relevant merchant at a relevant point in time (i.e., the user 202 is prompted to enroll with the merchant 204 with whom the user 202 is currently transacting or very recently transacted).

In an example, the retrieval of the user account provides address information that allows the payment processing network 206 to communicate with the computing device 208 that is running a Visa Checkout Software Development Kit (SDK). The Visa Checkout SDK comprises a code library embedded in an online banking app or website that is executed or accessed via the computing device 208. The online banking app or the website may be, for example, a mobile app or website offered by an issuer of a payment device that is associated with the user 202. The online banking app or the website displays a prompt that prompts the user 202 to enroll in an online store of the merchant 204. Details of this example including the online banking app or website of the issuer are described below with reference to FIG. 3.

The payment processing network 206 receives a response from the computing device 208 indicating consent from the user 202 to enroll in the membership account with the merchant 204. Based on the response, the payment processing network 206 transmits an enrollment request to a computer system associated with the merchant 204, where the enrollment request includes user information from the retrieved user account for the user 202. In the example described above where the payment processing network 206 is VisaNet and the user account is associated with the Visa Checkout digital payment service, the transmitting of the enrollment request may include sending a Visa Checkout information "payload" to the merchant 204. The payload contains information such as the name, billing address, shipping information, account information, email, and phone number for the user 202.

Based on the user information included in the enrollment request, the merchant 204 can enroll the user 202 in a membership account with the online store of the merchant 204. Thus, the user 202 is enrolled in the membership account based on pre-existing account information that is already on file (e.g., the existing user information on file with Visa Checkout, etc.), and the user 202 is not required to manually re-enter his or her personal information. After enrolling in the membership account, information on purchases made by the user 202 in the physical store of the merchant 204 is automatically logged and made available via the user's membership account in the online store of the merchant 204.

The exemplary account creation process described herein may be easily integrated into existing payment systems and conventions because the triggering event for the account creation process is a conventional payment using a payment device (e.g., using a traditional credit card) at a POS terminal, as described above. Both the user 202 and the merchant 204 can opt into or out of the service. For example, as described above, before performing the automatic account creation steps, the payment processing network 206 may first determine if the merchant 204 is enrolled in the service. The payment processing network 206 may make a similar determination as to whether the user 202 has opted into or out of the service and may or may not perform the account creation steps based on this determination. For example, the payment processing network 206 may query a database based on the user's account number, with the results of the query indicating if the user 202 has opted into or out of the service.

It should be understood that although the payment processing network 206 is depicted in FIG. 2 as being a single component (i.e., a single computer or server, as illustrated in the figure), the payment processing network 206 may comprise multiple computers, servers, and/or additional equipment connected in a networked arrangement. Similarly, it should be understood that although the merchant 204 is depicted as being a single component, the merchant 204 may comprise a plurality of components and systems. In an example, the POS device of the merchant 204 is located at a physical store of the merchant 204, and computer systems and servers of the merchant 204 are located outside of the physical store for operating the online store of the merchant 204.

Figure 3:
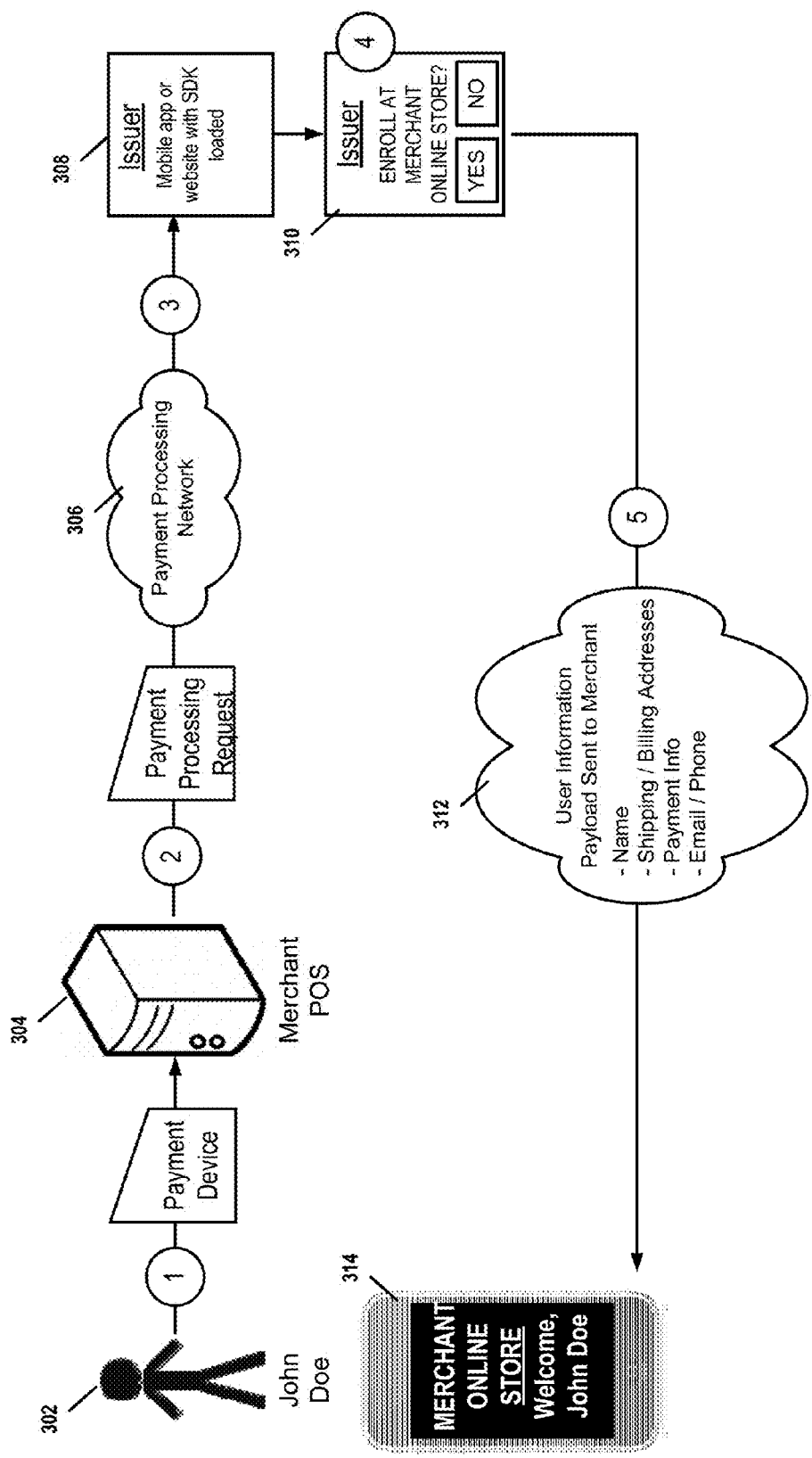
FIG. 3 is a block diagram depicting a user information payload being sent to a merchant to enable a user to create a membership account with the merchant.

FIG. 3 is a block diagram depicting a user information payload 312 being sent to a merchant to enable a user 302 to create a membership account with the merchant. In FIG. 3, initially, the user 302 provides his or her payment device to the merchant in order to make a payment to the merchant. The providing of the payment device to the merchant occurs at a merchant POS device 304 operated by the merchant and may occur, for example, within a physical store of the merchant. The merchant may be enrolled in a service for converting transactions at the physical POS device 304 into pre-registered accounts at the merchant's online store.

To complete the payment transaction, a payment processing request is transmitted from the merchant POS device 304 to a payment processing network 306. The payment processing request includes an account number associated with the user 302 or a representation thereof (e.g., a token, cryptogram, or another representation of the account number), among other information. The account number may be a credit card number or a debit card number, for example. The payment processing network 306 (e.g., VisaNet) inspects the payment processing request received from the merchant POS device 304 and makes a number of determinations based on the account number. First, the payment processing network 306 determines, based on the account number, if the user 302 has a user account with a service. In an example, the service is offered by the payment processing network 306. For instance, the service may be a digital payment service offered by the payment processing network 306, such as the Visa Checkout service offered by Visa. The determination as to whether the user 302 has the user account with the service may include querying a database based on the user's account number to determine if the account number is associated with such a service.

Next, after determining that the user 302 has the user account with the service, the payment processing network 306 makes a determination as to whether the user account includes information that associates a mobile device or computer 314 with the user account. This determination may be made, for example, by retrieving the user account based on the account number and determining if the user account includes address information for communicating with the mobile device or computer 314. The address information may be, for example, a mobile phone number to which a Short Message Service (SMS) message may be sent, an email address, an instant messaging handle, or a social media identifier, among other types of information. If it is determined that the user account includes information that associates the mobile device or computer 314 with the user account, then the steps described below are performed to enroll the user 302 in a membership account with the merchant.

In carrying out the steps of the account enrollment process, the mobile device or computer 314 of the user 302 may execute a particular software development kit (SDK). In an example, the mobile device or computer 314 is running a Visa Checkout SDK. The Visa Checkout SDK may comprise a code library embedded in an online banking app or website 306 that is executed or accessed by the mobile device or computer 314. The online banking app or the website 306 may be, for example, a mobile app or website offered by an issuer of a payment device that is associated with the user 302.

When the payment processing network 306 i) determines that the user 302 has the user account with the service (e.g., the Visa Checkout service), and ii) can connect the user account to the mobile device or computer 314 of the user 302, then the payment processing network 306 causes a command to be transmitted to the mobile device or computer 314. The command causes the mobile device or computer 314 to prompt the user 302 to enroll in a membership account with the merchant. The membership account may be, for example, a membership account with an online store operated by the merchant. An exemplary prompt 310 is illustrated in FIG. 3, showing the online banking app or website 306 of the issuer of the payment device (i.e., as displayed on the user's mobile device or computer 314 executing the aforementioned SDK) that prompts the user 302 to enroll in the online store of the merchant.

It should be understood that the use of the SDK and the issuer's online banking app or website is exemplary only, and that the user 302 may be prompted via the mobile device or computer 314 to enroll in the membership account in other ways. For example, the payment processing network 306 may cause a message (e.g., a text message or email) to be transmitted to the mobile device or computer 314, where the message prompts the user 302 to enroll in the membership account. In general, under the approaches described herein, any acceptable command or computer-readable instructions that cause the mobile device or computer 314 to prompt the user 302 to enroll in the membership account may be used.

The user 302 consents to enroll in the membership account by transmitting a response from the mobile device or computer 314 to the payment processing network 306 via the Internet. Based on this consent, a user information payload 312 is sent to the merchant. Specifically, the user information payload 312 is sent from the payment processing network 306 to the merchant. As described above, the payment processing network 306 determines if the user 302 has a user account with a service. In an example, the service is offered by the payment processing network 306 and may be, for example, the Visa Checkout service offered by Visa. Such services maintain a variety of personal information for the user 302, including information such as the user's name, billing address, shipping address, payment information (e.g., information associated with a payment device), email address, phone number, and more. The payment processing network 306 retrieves this personal information from the user's account with the service and provides this information to the merchant via the user information payload 312.

Based on the user information payload 312 received by the merchant, the merchant can set up a membership account for the user 302. As described above, the membership account may be a membership account in an online store or mobile app operated by the merchant. In an example, the user's first experience at the merchant's online store or mobile app is streamlined and pre-configured for the user 302. For example, as illustrated at 314 in FIG. 3, after the user 302 creates account credentials for the online store or app (e.g., sets a username and password), the user 302 may be greeted with a personalized message and may begin making purchases immediately using the payment, shipping, and other personal information provided to the merchant by the payment processing network 306. The user 302 need not manually enter this information. By contrast, in a conventional approach, the user 302 is not able to complete a purchase transaction until he or she completes the time-consuming process of manually entering various personal information and payment information.

The account creation processes described herein may benefit the merchant by creating online shoppers from in-store shoppers. Further, these processes may benefit an issuer of a payment device because the user 302 pre-registers his or her payment device with the merchant and thereby reduces the chance that the user 302 will use a payment method other than the payment device from the issuer (e.g., PayPal, etc.). The user 302 may benefit from these processes because he or she enjoys a premium, streamlined experience in enrolling in the membership account and shopping at the online store. The payment processing network 306 may benefit because these processes may create a higher volume of usage of the payment device.

Figure 4:
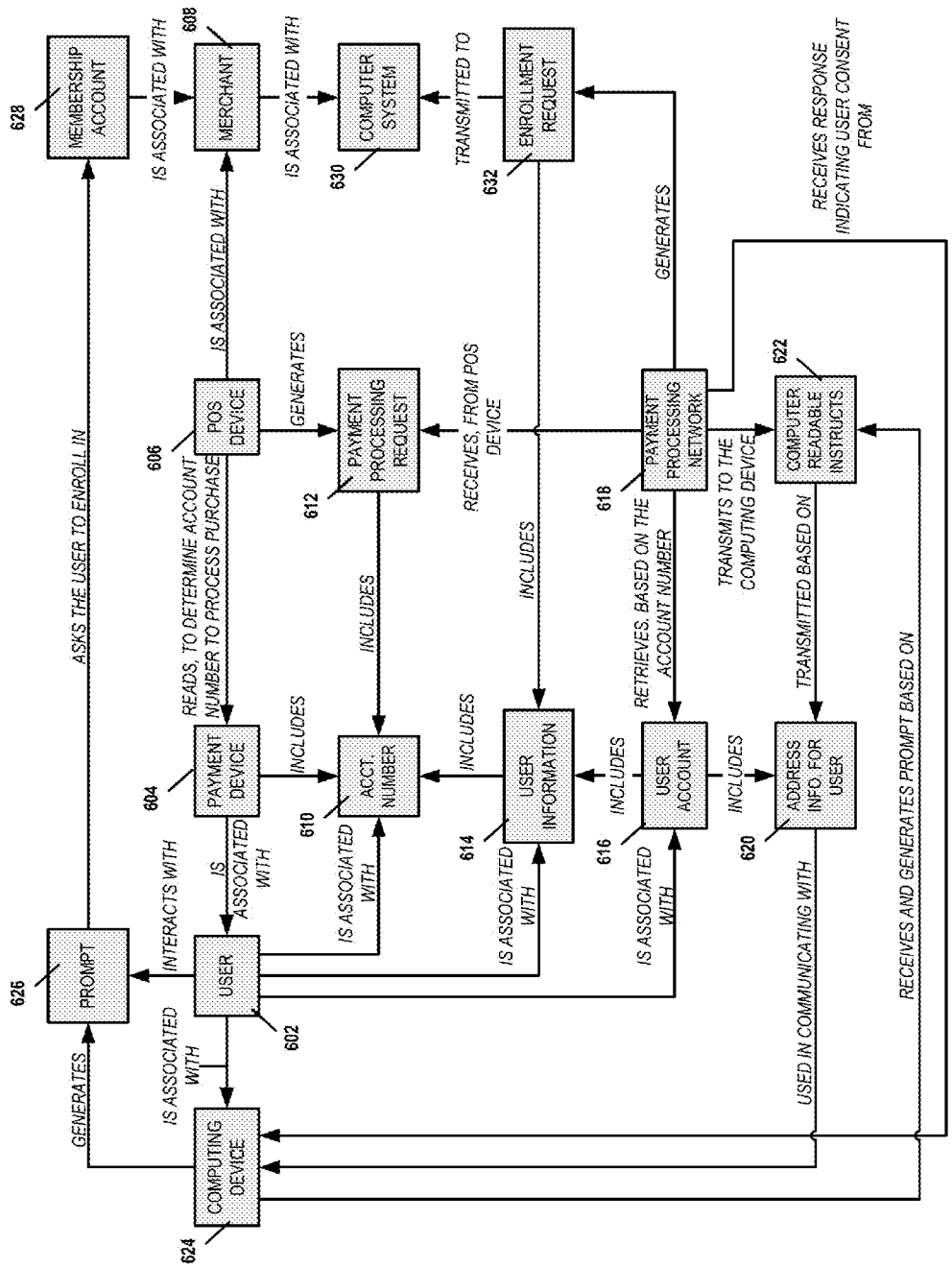
FIG. 4 is a block diagram depicting relationships between entities in an example system for enrolling a user in a membership account with a merchant.

FIG. 4 is a block diagram depicting relationships between entities in an example system for enrolling a user 602 in a membership account 628 with a merchant 608. As illustrated in FIG. 4, a payment processing network 618 receives a payment processing request 612 from a POS device 606 that is associated with the merchant 608. The POS device 606 generates or otherwise causes the payment processing request to be transmitted to the payment processing network 618. To accomplish this, the POS device 606 reads or processes a payment device 604 that is associated with the user 602 to determine an account number 610 for use in a payment transaction. The payment processing request 612 includes the account number 610 that is associated with the user 602 or a representation of the account number (e.g., a token, cryptogram, or another representation of the account number).

The payment processing network 618 retrieves, based on the account number 610, a user account 616 that is associated with the user 602. The user account 616 includes user information 614 associated with the user 602. The user information 614 includes a variety of information, including the account number 610 and address information 620 for the user 602. The address information 620 is be used in communicating with a computing device 624 that is associated with the user 602. The payment processing network 618 transmits computer-readable instructions 622 to the computing device 624 of the user 602, where the transmission is based on the address information 620 for the user 602. The computing device 624 of the user 602 receives the computer-readable instructions 622 and generates a prompt 626 based on the instructions 622.

The prompt 626 asks the user 602 to enroll in a membership account 628 that is associated with the merchant 608. The payment processing network 618 receives a response from the computing device 624 of the user 602, with the response indicating consent from the user 602 to enroll in the membership account 628. Based on the response, the payment processing network 618 generates an enrollment request 632 that includes the user information 614 from the user's user account 616. The enrollment request 632 is transmitted from the payment processing network 618 to a computer system 630, where the computer system 630 is associated with the merchant 608. Based on the user information 614 included in the enrollment request 632, the merchant 608 can thereafter enroll the user 602 in the membership account 628.

Figure 5:
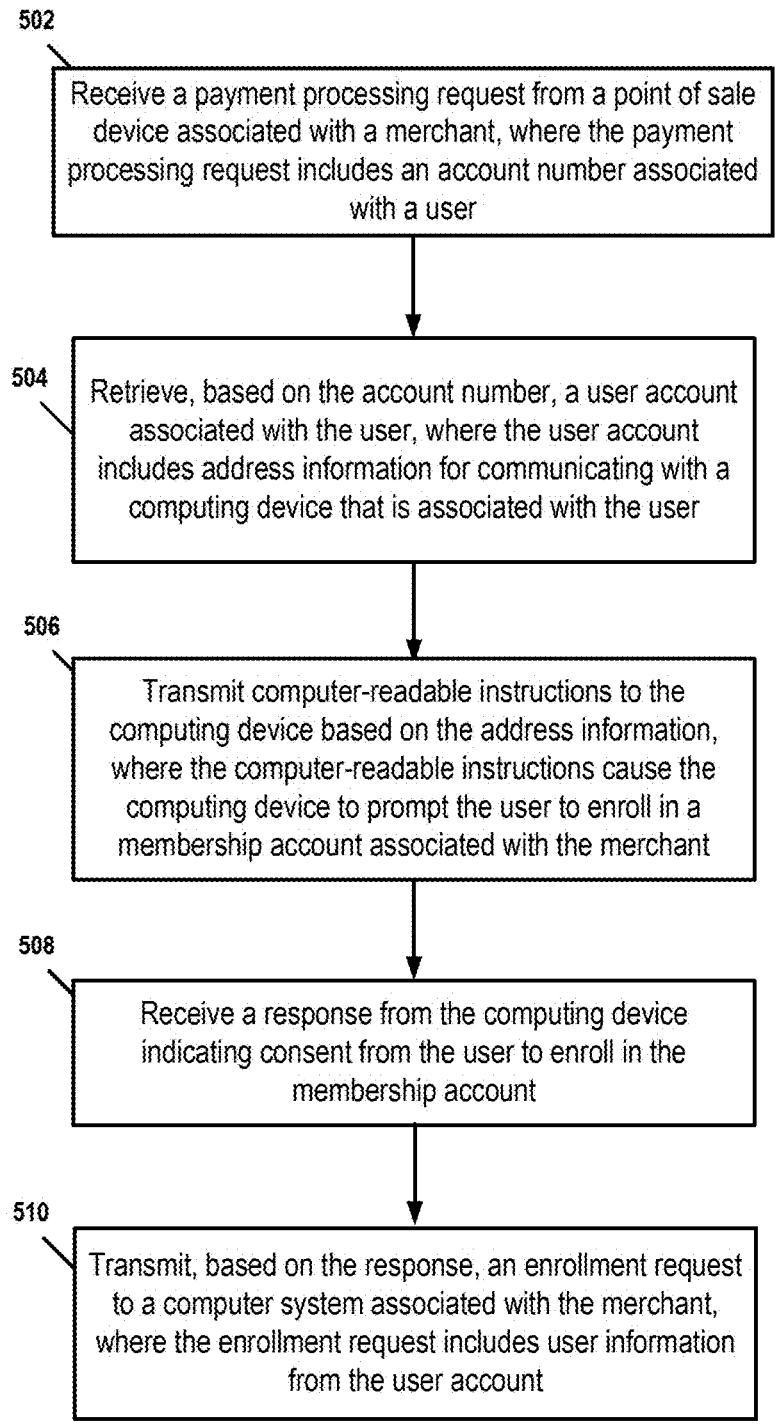
FIG. 5 is a flowchart illustrating an example method for enrolling a user in a membership account.

FIG. 5 is a flowchart illustrating an example method for enrolling a user in a membership account. At 502, a payment processing request is received from a point of sale device associated with a merchant. The payment processing request includes an account number associated with a user. At 504, based on the account number, a user account associated with the user is retrieved, where the user account includes address information for communicating with a computing device that is associated with the user. At 506, computer-readable instructions are transmitted to the computing device based on the address information, where the computer-readable instructions cause the computing device to prompt the user to enroll in a membership account associated with the merchant. At 508, a response is received from the computing device indicating consent from the user to enroll in the membership account. At 510, based on the response, an enrollment request is transmitted to a computer system associated with the merchant, where the enrollment request includes user information from the user account.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode. An exemplary payment device is described below.

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

For example, an exemplary mobile device may be a payment device that can be used to make payments, an access device (e.g., POS device) that may receive information from a consumer to conduct a transaction, and/or a multi-purpose general use device. The exemplary mobile device may comprise a computer readable medium that is present within the body (or outer casing) of the mobile device, or the computer readable medium could be detachable from the mobile device (e.g., the computer readable medium could comprise an external memory that could be connected through a physical interface such as a USB connection, or the data could be hosted remotely and accessed wirelessly by the device, e.g., the data could be hosted and stored at a remoter server in the "cloud"). The computer readable medium may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device (such as to an access device), via any suitable method, including the use of antenna or contactless element. The body of the mobile device may be in the form a plastic substrate, housing, or other structure.

In some embodiments, the mobile device may further include a contactless element, which is typically implemented in the form of a semiconductor chip (or other data storage element) with an associated wireless transfer (e.g., data transmission) element, such as an antenna. Contactless element may be coupled to (e.g., embedded within) the mobile device and data or control instructions that are transmitted via a cellular network may be applied to the contactless element by means of a contactless element interface. The contactless element interface functions to permit the exchange of data and/or control instructions between the mobile device circuitry and an optional contactless element, or between another device having a contactless element (e.g., a POS terminal or a payment device). The contactless element may be capable of transferring and receiving data using a short range wireless communication capability. As noted above, mobile device may comprise components to both be the interrogator device (e.g., receiving data) and the interrogated device (e.g., sending data). Thus, the mobile device may be capable of communicating and transferring data or control instructions via both cellular network (or any other suitable wireless network, e.g., the Internet or other data network) and short range communications.

The mobile device may also include a processor (e.g., a microprocessor) for processing the functions of a phone and a display to allow a consumer to see phone numbers and other information and messages. The mobile device may further include input elements to allow a user to input information into the device, a speaker to allow the user to hear voice communication, music, etc., and a microphone to allow the user to transmit her voice through the mobile device. The mobile device may also include an antenna for wireless data transfer (e.g., data transmission).

A payment device may be in the form of a card. The payment device may comprise a plastic substrate. In some embodiments, a contactless element for interfacing with an access device may be present on, or embedded within, the plastic substrate. Consumer information such as an account number, expiration date, and/or a user name may be printed or embossed on the card. A magnetic stripe may also be on the plastic substrate. In some embodiments, the payment device may comprise a microprocessor and/or memory chips with user data stored in them.

As noted above, the payment device may include both a magnetic stripe and a contactless element. In some embodiments, both the magnetic stripe and the contactless element may be in the payment device. In some embodiments, either the magnetic stripe or the contactless element may be present in the payment device.

Figure 6A:
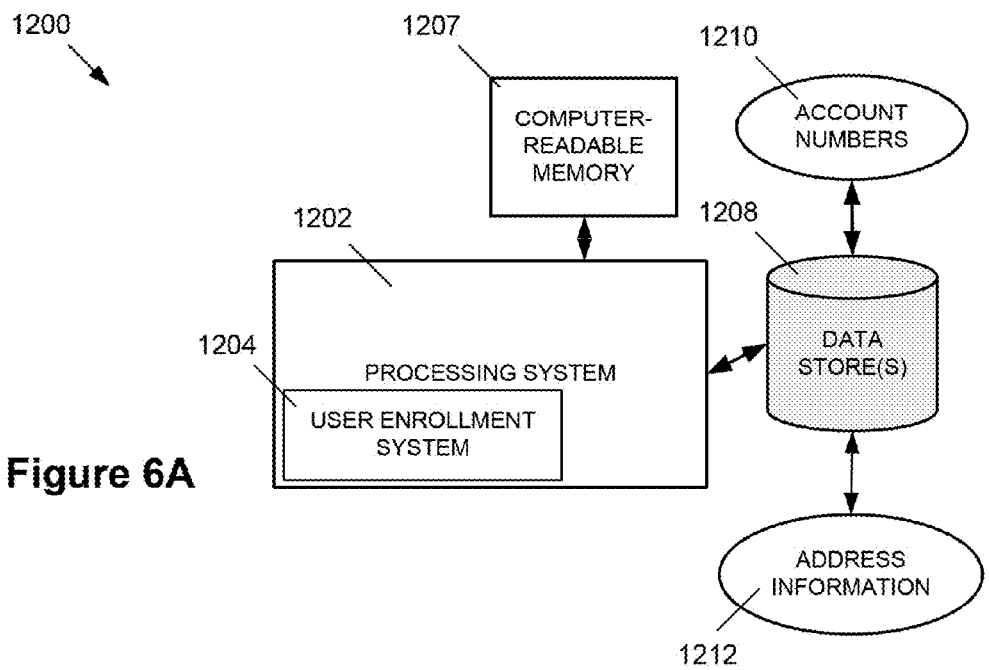
FIGS. 6A, 6B, and 6C depict example systems for enrolling a user in a membership account.
Figure 6B:
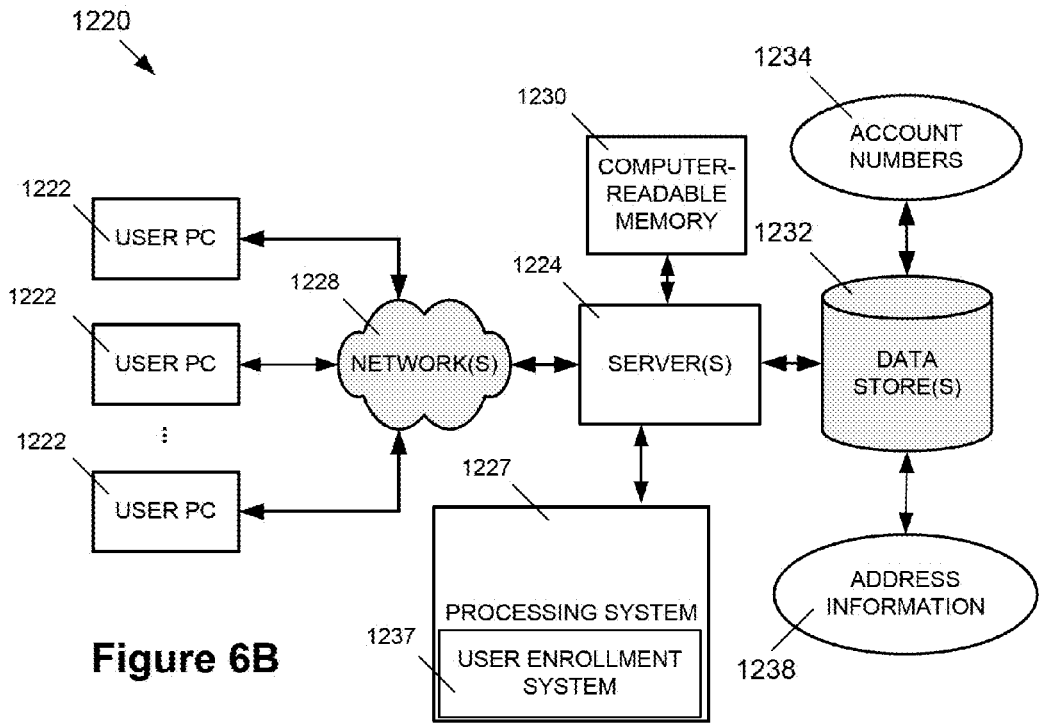
Figure 6C:
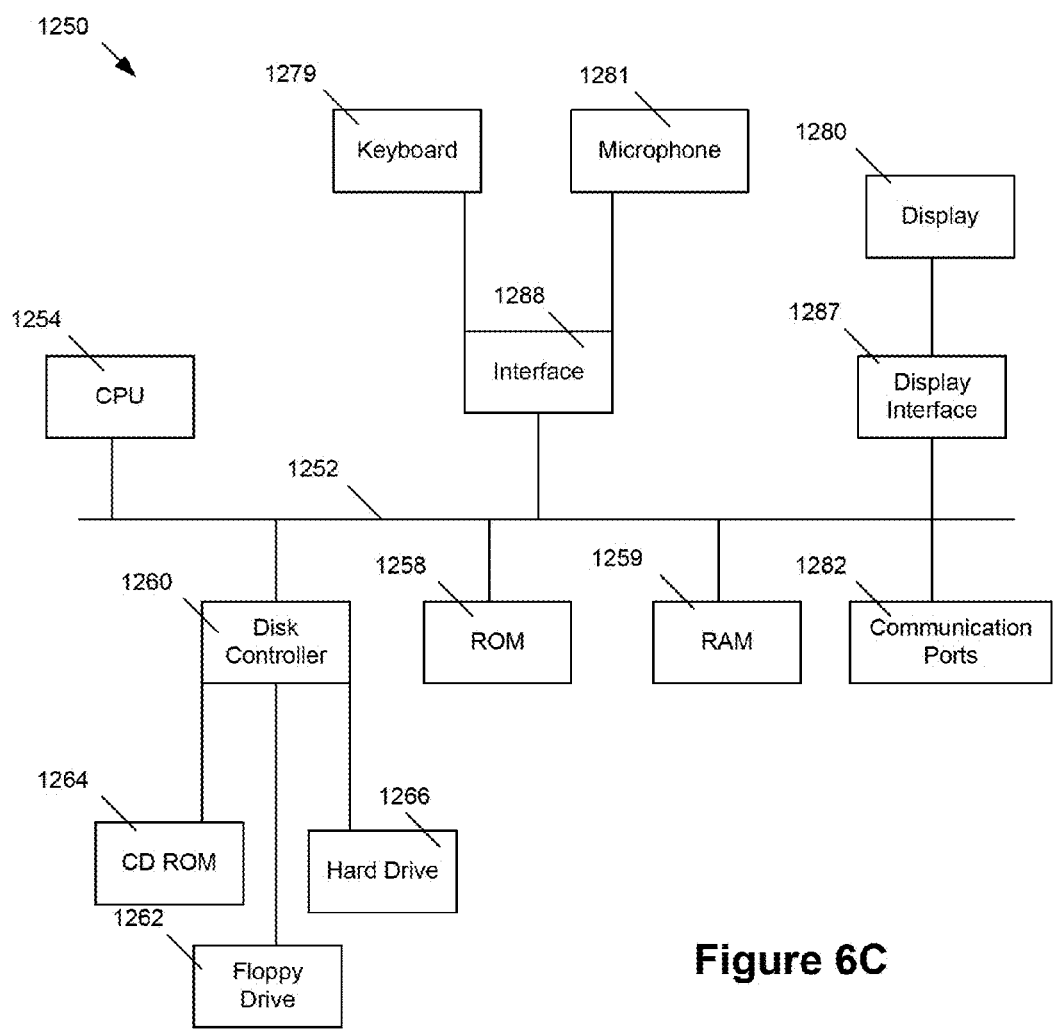

FIGS. 6A, 6B, and 6C depict example systems for enrolling a user in a membership account. For example, FIG. 6A depicts an exemplary system 1200 that includes a standalone computer architecture where a processing system 1202 (e.g., one or more computer processors located in a given computer or in multiple computers that may be separate and distinct from one another) includes a user enrollment system 1204 being executed on the processing system 1202. The processing system 1202 has access to a computer-readable memory 1207 in addition to one or more data stores 1208. The one or more data stores 1208 may include user account numbers 1210 as well as user address information 1212. The processing system 1202 may be a distributed parallel computing environment, which may be used to handle very large-scale data sets.

FIG. 6B depicts a system 1220 that includes a client-server architecture. One or more user PCs 1222 access one or more servers 1224 running a user enrollment system 1237 on a processing system 1227 via one or more networks 1228. The one or more servers 1224 may access a computer-readable memory 1230 as well as one or more data stores 1232. The one or more data stores 1232 may include user account numbers 1234 as well as user address information 1238.

FIG. 6C shows a block diagram of exemplary hardware for a standalone computer architecture 1250, such as the architecture depicted in FIG. 6A that may be used to include and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1258 and random access memory (RAM) 1259, may be in communication with the processing system 1254 and may include one or more programming instructions for performing the method of enrolling a user in a membership account. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 1207, 1230, 1258, 1259 or data stores 1208, 1232, 1262, 1264, 1266 may include one or more data structures for storing and associating various data used in the example systems for enrolling a user in a membership account. For example, a data structure stored in any of the aforementioned locations may be used to store data including user information, computer-readable instructions for generating a prompt, payment processing requests, etc. A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1258 and/or the RAM 1259. The processor 1254 may access one or more components as required.

A display interface 1287 may permit information from the bus 1252 to be displayed on a display 1280 in audio, graphic, or alphanumeric format. Communication with external devices may optionally occur using various communication ports 1282.

In addition to these computer-type components, the hardware may also include data input devices, such as a keyboard 1279, or other input device 1281, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for enrolling a user, the computer-implemented method comprising:
   receiving, by a payment processing network, a payment processing request for an in-store user purchase from a point of sale device at a physical store of a merchant, wherein the payment processing request includes:
   an account number associated with the user, and
   a merchant identifier associated with the merchant;
   based on the merchant identifier, determining, by the payment processing network, that the merchant is enrolled in a service for automatically enrolling in-store customers;
   based on the account number, retrieving, by the payment processing network, a user account associated with the user, wherein the user account is for a digital payment service associated with the payment processing network, and wherein the user account includes address information for communicating with a computing device that is associated with the user;
   based on the user account, determining, by the payment processing network, that the user is eligible to receive prompts to enroll in internet-based online stores;
   transmitting, by the payment processing network, computer-readable instructions to the computing device based on the address information, wherein the computer-readable instructions cause the computing device to prompt the user to enroll in an internet-based online store of the merchant;
   receiving, by the payment processing network, a response from the computing device indicating consent from the user to enroll in the internet-based online store of the merchant;
   based on the response, transmitting, by the payment processing network, an enrollment request to a computer system associated with the merchant to enroll the user in the internet-based online store of the merchant during the in-store purchase from the point of sale device at the physical store of the merchant; and
   processing a payment associated with the payment processing request.

2. The computer-implemented method of claim 1, wherein the payment processing request is a request to process a transaction associated with a payment device.

3. The computer-implemented method of claim 1, wherein the transmitting of the enrollment request to the computer system causes the user to be enrolled in the internet-based online store of the merchant without subsequent input from the user.

4. The computer-implemented method of claim 1, wherein the transmitting of the enrollment request to the computer system causes the user to be enrolled in the internet-based online store of the merchant without the user manually inputting his or her name, address, and payment information.

5. The computer-implemented method of claim 1, wherein the account number includes a credit card number, a debit card number, a bank account number, a number associated with the digital payment service, or a pre-paid card number.

6. The computer-implemented method of claim 1, wherein the computing device is a mobile device, a smartphone, a tablet computer, a laptop computer, or a desktop computer.

7. The computer-implemented method of claim 1, wherein the enrollment request includes at least a shipping address of the user.

8. The computer-implemented method of claim 1, wherein the enrollment request includes user information from the user account, and wherein the user information includes payment information for the user, and wherein the enrollment of the user in the internet-based online store of the merchant enables the user to purchase items in the internet-based online store of the merchant using the payment information.

9. The computer-implemented method of claim 1, wherein information on the in-store user purchase made by the user at the physical store of the merchant is available online to the user via the internet-based online store of the merchant.

10. The computer-implemented method of claim 1 comprising:
    wherein the eligibility of the user to receive prompts to enroll in internet-based online stores is determined based on the user previously requesting to receive the prompts or based on the user not opting out of receiving the prompts.

11. The computer-implemented method of claim 1, wherein the enrollment request includes user information from the user account, and wherein the user information includes:
    a name of the user;
    an address of the user;
    a phone number of the user;
    an email address of the user; and
    payment information for the user.

12. The computer-implemented method of claim 11, wherein the user is enrolled in the internet-based online store of the merchant based on the user information included in the enrollment request, and wherein the enrollment of the user is completed without the user manually inputting the name, the address, the phone number, the email address, and the payment information.

13. The computer-implemented method of claim 1, wherein the computer-readable instructions are interpreted using a mobile app of the computing device or a web browser of the computing device.

14. The computer-implemented method of claim 1, wherein the computing device associated with the user is a mobile device or a computer executing a code library that is embedded in a mobile app or website, and wherein the executing of the code library enables the computing device to interpret the computer-readable instructions and transmit the response indicating consent.

15. The computer-implemented method of claim 1, wherein the enrollment request includes user information from the user account, the method further comprising:
    retrieving the address information and the user information from the digital payment service.

16. A computer-implemented system for enrolling a user, the computer-implemented system comprising:
    a processing system; and
    a memory in communication with the processing system, wherein the processing system is configured to execute steps comprising:
    receiving, by a payment processing network, a payment processing request for an in-store user purchase from a point of sale device associated at a physical store of a merchant, wherein the payment processing request includes:
    an account number associated with the user, and a merchant identifier associated with the merchant;
based on the merchant identifier, determining, by the payment processing network, that the merchant is enrolled in a service for automatically enrolling in-store customers;
based on the account number, retrieving, by the payment processing network, a user account associated with the user, wherein the user account is for a digital payment service associated with the payment processing network, and wherein the user account includes address information for communicating with a computing device that is associated with the user;
based on the user account, determining, by the payment processing network, that the user is eligible to receive prompts to enroll in internet-based online stores;
transmitting, by the payment processing network, computer-readable instructions to the computing device based on the address information, wherein the computer-readable instructions cause the computing device to prompt the user to enroll in an internet-based online store of the merchant;
receiving, by the payment processing network, a response from the computing device indicating consent from the user to enroll in the internet-based online store of the merchant;
based on the response, transmitting, by the payment processing network, an enrollment request to a computer system associated with the merchant to enroll the user in the internet-based online store of the merchant during the in-store purchase from the point of sale device at the physical store of the merchant; and
processing a payment associated with the payment processing request.

17. A non-transitory computer-readable storage medium for enrolling a user, the computer-readable storage medium comprising computer-executable instructions which, when executed, cause a processing system to execute steps comprising:

receiving, by a payment processing network, a payment processing request from a point of sale device at a physical store of a merchant, wherein the payment processing request includes:
an account number associated with a user, and
a merchant identifier associated with the merchant;
based on the merchant identifier, determining, by the payment processing network, that the merchant is enrolled in a service for automatically enrolling in-store customers;
based on the account number, retrieving, by the payment processing network, a user account associated with the user, wherein the user account is for a digital payment service associated with the payment processing network, and wherein the user account includes address information for communicating with a computing device that is associated with the user;
based on the user account, determining, by the payment processing network, that the user is eligible to receive prompts to enroll in internet-based online stores;
transmitting, by the payment processing network, computer-readable instructions to the computing device based on the address information, wherein the computer-readable instructions cause the computing device to prompt the user to enroll in an internet-based online store of the merchant;
receiving, by the payment processing network, a response from the computing device indicating consent from the user to enroll in the internet-based online store of the merchant;
based on the response, transmitting, by the payment processing network, an enrollment request to a computer system associated with the merchant to enroll the user in the internet-based online store of the merchant during the in-store purchase from the point of sale device at the physical store of the merchant; and
processing a payment associated with the payment processing request.

* * * * *